(No Model.)
A. W. SMITH.
ELECTRIC MOTOR OR DYNAMO.
No. 484,724. Patented Oct. 18, 1892.
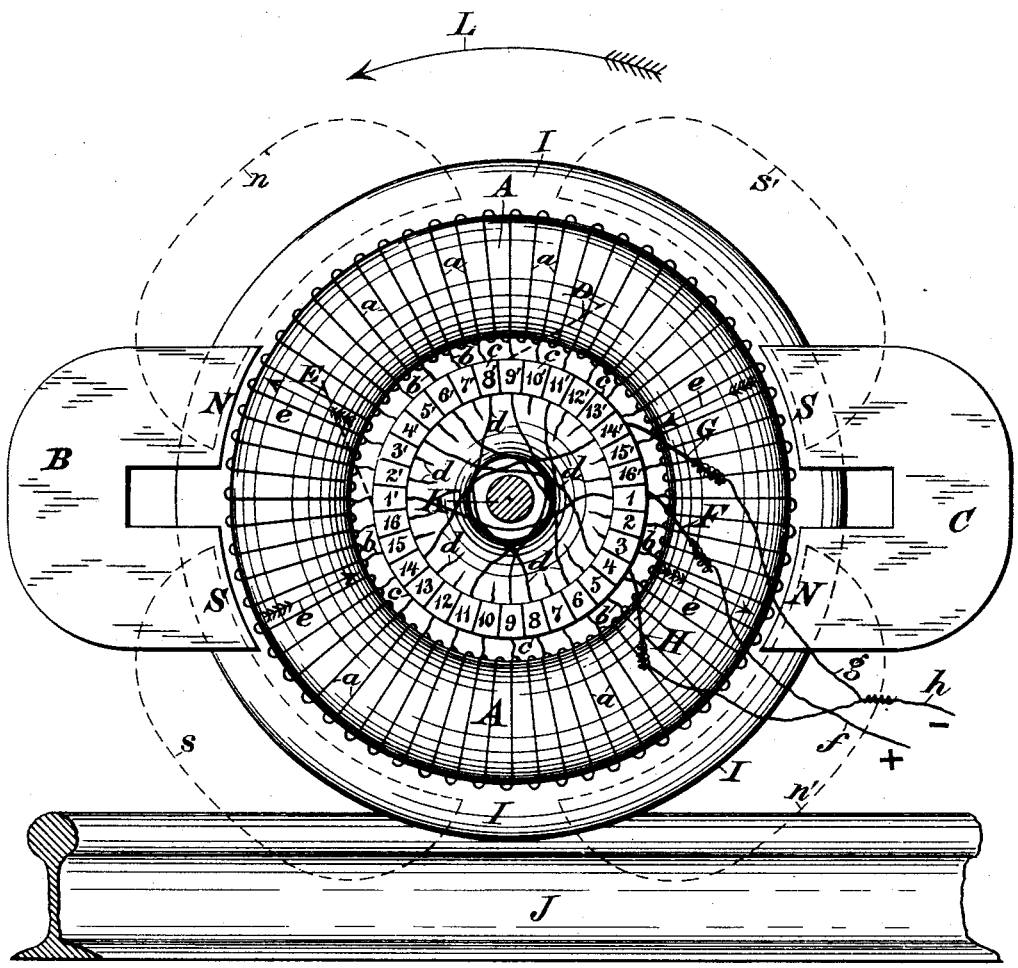
Witnesses:
W. H. Smyth
Geo. W. Ueffinger.
Inventor.
Albert W. Smith

UNITED STATES PATENT OFFICE.

ALBERT W. SMITH, OF SAN FRANCISCO, CALIFORNIA.

ELECTRIC MOTOR OR DYNAMO.

SPECIFICATION forming part of Letters Patent No. 484,724, dated October 18, 1892.

Application filed January 25, 1892. Serial No. 419,209. (No model.)

*To all whom it may concern:*

Be it known that I, ALBERT W. SMITH, a citizen of the United States, residing in the city and county of San Francisco, and State of California, have invented certain new and useful Improvements in Electric Motors or Dynamos, of which the following is a specification.

My invention relates especially to slow-speed multipolar motors for car propulsion, and in particular to that class in which the armature is mounted directly on the car-axle; and its objects are to secure the maximum velocity of the armature-conductor, together with the minimum electric resistance possible with an armature mounted directly on the car-axle.

To this end it consists in the use of an armature of the largest permissible diameter, in means for restricting the area of magnetization of the armature, and thus obtaining the greatest possible magnetic density per unit of armature area to the end that the active armature-wire may be most economically engaged and not be passing through a field of greatly-varying density, as is commonly the case, and in means for leaving out of circuit those portions of the armature-wire which are idle and not passing through the magnetic field, thereby lowering the armature resistance and rendering the motor more efficient.

The drawing herewith is a diagrammatic representation of my invention.

The ring-armature A is mounted on the car-axle K and wound with the well-known Gramme or closed-circuit winding $a\ a\ a$. Top wires $b\ b\ b$ connect coils $a\ a\ a$ with segment $c\ c\ c$ in the usual way, each pair of diametrically-opposite segments, as 1 and 1', are electrically connected by means of cross connecting-wires $d\ d\ d$, some of which are shown discontinuous to avoid confusion of lines.

B and C are field-magnets acting on armature A at diametrically-opposite points. The poles of magnets B and C alternate around the armature in the order N S N S, as usual in present practice.

The dotted lines D and E indicate the relative positions of brushes as used in the present practice.

F is the positive brush bearing on segment 1 and forming one terminal of the armature.

G and H are two negative brushes bearing, respectively, on segments 14' and 4, and connected together by means of wires $g$ and $h$ to form the other armature-terminal.

$f$ is a wire connected with brush F.

I is a car-wheel mounted on axle K and bearing on track-rail J.

L is an arrow showing the direction of rotation.

The arrows $e\ e\ e\ e$ indicate the direction of current-flow in coils $a\ a\ a$.

The areas $n$, $s$, $n'$, and $s'$ (shown in dotted lines) indicate the relative positions usually occupied by magnet pole-pieces in the present practice.

Having briefly referred to the details, I will now explain the mode of operation and the functional correlation of the interdependent elements. In the present practice of constructing four-pole machines the poles are placed equidistant from one another and cover the greater portion of the circumferential area of the armature A, as shown by the dotted areas $n$, $s$, $n'$, and $s'$, and if the armature-winding is cross-connected two brushes D and E are placed ninety degrees apart or in contact with segments 1' and 9', respectively. By this construction all the armature-wire is in circuit at all times, the current entering at brush E and leaving at brush D. It is a well-known fact that the magnetic field in a motor varies greatly in density and is most intense in those ends of the pole-pieces toward which the armature is turning, also, that the dense portion of the field is confined to a comparatively small area of the radiating surface of the pole-pieces. It follows, therefore, that only those portions of the armature-wire which are passing through this intense portion of the field are economically active, and all the balance of the armature-wire is idle in proportion as the field is less intense, and, as in a slow-speed armature the amount of wire is greatly increased to compensate for reduced speed of rotation it follows that the comparatively idle wire is mainly a large useless resistance in the circuit and causes, therefore, a waste of energy, and hence a proportionate lowering of the efficiency of the motor. In order to concentrate the lines of force, and thus restrict the area of armature magnetization I discard the use of large pole-pieces as employed in present practice and bring the unlike poles of magnets B and C close together, limiting their polar radiating area to about the cross-sectional area of the magnetic circuit of magnets B and C, thus obtaining the greatest possible magnetic density per unit of armature area, obtaining thereby, also, a shorter and hence a more efficient magnetic circuit, as well as greater compactness and economy of construction. In order to leave out of circuit all those portions of the armature-wire but those which are most economically active, I place the positive brush F, in contact with segment 1, and the two negative brushes G and H are placed one on each side of brush F and at such an angular distance from it that all the wire passing through the magnetic field will be included in circuit, or, as shown, in contact with segments 14' and 4, respectively. By this arrangement of the brushes the current has four paths, as indicated by arrows $e\ e\ e\ e$, or from segment 1 through the wire under the pole N of magnet C to segment 4 and out at brush H, from segment 1 through the wire under pole S of magnet C to segment 14' and out at brush G, from segment 1 to segment 1' through the wire under the pole N of magnet B to segment 4', across to segment 4 and out at brush H; also through the wire under pole S of magnet B to segment 14, across to segment 14', and out at brush G. With the currents circulating as just described the armature tends to turn as indicated by arrow L, and those portions of the armature-wire embraced between segments 14' and 4' and 14 and 4 are entirely out of circuit, and if the magnets B and C are of equal strength and the armature-winding $a\ a\ a$ is symmetrical throughout no induced currents can circulate in the idle portions of armature-wire, because the several electro-motive forces act opposite to and neutralize each other, that induced by pole N of magnet C opposing that induced by pole S of magnet C through cross-wires $d\ d\ d$ and that induced by pole N of magnet B opposing that induced by pole S of magnet B through cross-wires $d\ d\ d$; also that induced by pole N of magnet C opposing that induced by pole S of magnet B through the idle wire embraced between segments 4 and 14; also that induced by pole S of magnet C opposing that induced by pole N of magnet B through the idle wire embraced between segments 14' and 4'. It must therefore appear evident that the wire embraced between segments 14' and 4' and 14 and 4 is entirely out of circuit and not absorbing and wasting energy, as is commonly the case, and that therefore the efficiency of the armature is enhanced in proportion as its resistance is lessened.

With the construction of present practice of placing the magnet-poles, as indicated by areas $s$ and $n'$ to its under side, the diameter of armature A is limited. The condition of highest possible conductor-velocity can therefore not be realized by this mode of construction.

By bringing the poles N and S of magnets B and C close together I am enabled to use an armature of the largest possible diameter, thus obtaining the maximum conductor-velocity possible with an armature mounted directly on the car-axle.

It is a well-known fact that railway-motor armatures constructed in accordance with present practice are very liable to burn out when overloaded or suddenly thrown into circuit. With my system of construction this danger is greatly lessened, as any given portion of the wire is not always in circuit, but alternately out of circuit and in circuit, and will therefore heat less in proportion as it is less in circuit under any given conditions of current-flow through the armature.

Having now fully described my invention, I will state that various modifications thereof are possible. For instance, in lieu of placing brushes G and H, as shown, each side of brush F, they may be placed in contact with segments 14 and 4', respectively. In lieu of cross connecting-wires $d\ d\ d$, which serve to connect those portions of the armature-wire under poles N and S of magnet B in multiple arc with those portions of the wire under poles N and S of magnet C, a second set of brushes can be applied to segments 1', 14, and 4', respectively. Instead of placing the magnets B and C at diametrically-opposite points or at an angle of one hundred and eighty degrees from one another, they may be placed at other angles from one another—as, for instance, one hundred and seventy degrees; but in this case it would also be necessary to connect the commutator-segments $c\ c\ c$ with those at an angle of one hundred and seventy degrees from them. In lieu of connecting those portions of the armature-wire passing under diametrically-opposite poles of like sign in multiple arc with one another by means of cross connecting-wires $d\ d\ d$ they may be connected in series with one another by the methods commonly practiced in multipolar machines.

My invention can also be applied to high-speed motors and generating-dynamos with equally-beneficial results.

I claim as my invention—

1. In an electric motor or dynamo, in combination, a ring-armature wound with a Gramme winding, and two field-magnets having their respective unlike poles in close proximity, placed at diametrically-opposite points of the armature, the poles alternating around the armature in the order N S N S, as set forth.

2. In an electric motor or dynamo, in combination, a ring-armature wound with a Gramme winding, a commutator the bars of which are cross-connected with those diametrically opposite, and two field-magnets having their respective unlike poles in close proximity placed at diametrically-opposite points of the armature, the poles alternating around the armature in the order N S N S, as set forth.

3. In an electric motor or dynamo, in combination, a ring-armature wound with a Gramme winding, a commutator the bars of which are cross-connected with those diametrically opposite, and two field-magnets having their respective unlike poles in close proximity placed at diametrically-opposite points of the armature, the poles alternating around the armature in the order N S N S, the space between two unlike poles belonging to the same magnet being shorter than the space between two unlike poles belonging to the two different magnets, as set forth.

4. In an electric motor or dynamo, in combination, a ring-armature wound with a Gramme winding, a commutator the bars of which are cross-connected with those diametrically opposite, and two field-magnets having their respective unlike poles in close proximity placed at diametrically-opposite points of the armature, the poles alternating around the armature in the order N S N S, the space between two unlike poles belonging to the same magnet being shorter than the space between two unlike poles belonging to the two different magnets, and two connected brushes of one sign embracing a single brush of opposite sign placed between unlike poles belonging to the same magnet, as set forth.

5. In an electric motor or dynamo, in combination, a ring-armature wound with a Gramme or closed-circuit winding connected to a commutator, the equipotential parts of which are in electrical connection, and inducing field-magnets having their respective unlike poles in close proximity, said field-magnets being symmetrically arranged with relation to the armature circumference or working surface, the poles alternating around the armature in the order N S N S, the space between two unlike poles belonging to the same magnet being shorter than the space between two unlike poles belonging to different magnets, two electrically-connected brushes of one sign placed one on each side of a single brush of opposite sign bearing on the commutator at a point which is in electrical connection with that part of the armature-winding between two unlike poles belonging to the same inducing-magnet, and the two connected brushes of one sign being placed at such an angular distance each side from the single brush of opposite sign that all the armature-wire which is passing through the magnetic field will be included in the circuit or circuits from the two brushes of one sign to the single brush of opposite sign, as set forth.

ALBERT W. SMITH.

Witnesses:
GEO. M. MEFFINGER,
T. WEEGMANN.